United States Patent
Hedman et al.

(10) Patent No.: US 12,069,471 B2
(45) Date of Patent: Aug. 20, 2024

(54) HANDLING OF NAS CONTAINER IN REGISTRATION REQUEST AT AMF RE-ALLOCATION

(71) Applicant: TELEFONAKTIEBOLAGET LM ERICSSON (PUBL), Stockholm (SE)

(72) Inventors: Peter Hedman, Helsingborg (SE); Vlasios Tsiatsis, Solna (SE); Monica Wifvesson, Lund (SE); Qian Chen, Mölndal (SE); Noamen Ben Henda, Vällingby (SE); Ivo Sedlacek, Hovorcovice (CZ)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 265 days.

(21) Appl. No.: 17/620,587

(22) PCT Filed: Jun. 12, 2020

(86) PCT No.: PCT/EP2020/066306
§ 371 (c)(1),
(2) Date: Dec. 17, 2021

(87) PCT Pub. No.: WO2020/254204
PCT Pub. Date: Dec. 24, 2020

(65) Prior Publication Data
US 2022/0322080 A1    Oct. 6, 2022

Related U.S. Application Data

(60) Provisional application No. 62/862,482, filed on Jun. 17, 2019.

(51) Int. Cl.
*H04M 1/66* (2006.01)
*H04W 12/03* (2021.01)
(Continued)

(52) U.S. Cl.
CPC ......... *H04W 12/03* (2021.01); *H04W 12/041* (2021.01); *H04W 12/106* (2021.01); *H04W 36/0038* (2013.01)

(58) Field of Classification Search
CPC . H04W 12/03; H04W 12/041; H04W 12/106; H04W 36/0038
See application file for complete search history.

(56) References Cited

U.S. PATENT DOCUMENTS

| 11,012,855 | B2 * | 5/2021 | Wu | H04W 80/10 |
|---|---|---|---|---|
| 2018/0227871 | A1 * | 8/2018 | Singh | H04W 48/18 |

(Continued)

FOREIGN PATENT DOCUMENTS

WO    2018236819 A1    12/2018

OTHER PUBLICATIONS

3GPP TS 23.501 V16.0.2, "3rd Generation Partnership Project; Technical Specification Group Services and System Aspects; System Architecture for the 5G System; Stage 2 (Release 16)", 3GPP TS 23.501 V16.0.2, Apr. 2019.

(Continued)

*Primary Examiner* — Shantell L Heiber
(74) *Attorney, Agent, or Firm* — Sage Patent Group

(57) ABSTRACT

The AMF re-allocation procedure for an Initiating AMF that has reroute capability via an Access Network (AN) is optimized in scenarios where a wireless device, such as a User Equipment (UE), already shares a 5G security context with-in a Last Serving AMF that is different from the Initiating AMF, and where the Initiating AMF and the Last Serving AMF can communicate with each other via an interface.

20 Claims, 14 Drawing Sheets

(51) Int. Cl.
*H04W 12/041* (2021.01)
*H04W 12/106* (2021.01)
*H04W 36/00* (2009.01)

(56) References Cited

U.S. PATENT DOCUMENTS

| | | | |
|---|---|---|---|
| 2019/0037407 A1* | 1/2019 | Nair | H04W 12/106 |
| 2020/0107250 A1* | 4/2020 | So | H04W 48/18 |
| 2020/0162898 A1* | 5/2020 | Nair | H04W 12/082 |

OTHER PUBLICATIONS

3GPP TS 23.502 V16.0.2, "3rd Generation Partnership Project; Technical Specification Group Services and System Aspects; Procedures for the 5G System; Stage 2, (Release 16)" 3GPP TS 23.502 V16.0.2, Apr. 2019.

3GPP TS 23.502 V16.1.1, "3rd Generation Partnership Project; Technical Specification Group Services and System Aspects; Procedures for the 5G System; Stage 2 (Release 16)", 3GPP TS 23.502 V16.1.1, Jun. 2019.

3GPP TS 33.501 V15.3.0, "3rd Generation Partnership Project; Technical Specification Group Services and System Aspects; Security architecture and procedures for 5G system (Release 15)", 3GPP TS 33.501 V15.3.0, Dec. 2018.

Huawei et al., S2-1812356, "Update of Solution#22 with the standalone NPN architecture", SA WG2 Meeting #129bis, S2-1812356, Nov. 26-Nov. 30, 2018, West Palm Beach, Florida, US.

Huawei et al., S3-191411, "Registration failure in registration procedure with AMF reallocation caused by slicing", 3GPP TSG-SA WG3 Meeting #95, S3-191411, Reno (US), May 6-10, 2019.

Huawei et al., S3-191413 "Solving registration failure in initial registration procedure with AMF reallocation", 3GPP TSG-SA WG3 Meeting #95, S3-191413, Reno (US), May 6-10, 2019.

ZTE Corporation, S3-183313, "Modification of initial NAS message protection", 3GPP TSG-SA WG3 Meeting #93, S3-183313, Spokane, US, Nov. 12-16, 2018.

First Office Action dated Dec. 11, 2023 for Chinese Patent Application No. 202080057244.7, 8 pages (includes English translation).

Samsung et al.; "TS 23.502: Ol#4c. Allowed NSSAI in new RA"; SA WG2 Meeting #123; S2-177447; Oct. 23-27, 2017; Ljubljana, Slovenia; 10 pages.

\* cited by examiner

HANDLING OF NAS CONTAINER IN REGISTRATION REQUEST AT AMF RE-ALLOCATION

RELATED APPLICATIONS

This application is a national stage application of International Patent Application No. PCT/EP2020/066306, filed Jun. 12, 2020, which claims priority to and the benefit of U.S. Provisional Application No. 62/862,482, filed on Jun. 17, 2019 and entitled "HANDLING OF NAS CONTAINER IN REGISTRATION REQUEST AT AMF RE-ALLOCATION," the disclosure of which are incorporated in their entirety by reference.

TECHNICAL FIELD

The present disclosure relates generally to wireless communication networks, and more particularly, to Access and Mobility Management Function (AMF) re-allocation procedures for an Initiating AMF having reroute capability via a Radio Access Network (RAN).

BACKGROUND

Wireless communication networks provide voice and data communication between a network of fixed nodes and a large number of mobile, wireless devices, such as mobile telephones, smartphones, laptop and tablet computers, wearable devices, vehicles, and the like. One set of technical specifications and protocols for wireless cellular communication networks is established, maintained, and promulgated by the Third Generation Partnership Project (3GPP).

At a very high level, wireless cellular communication networks standardized by 3GPP, such as network seen in FIG. 1, can at a very high level, be characterized as comprising a (large number of) user equipment (UEs), a radio access network (RAN), and core network (CN). The UE is a stationary or mobile device which wirelessly accesses the network. Although denominated "user" equipment, UE more broadly includes machine type communications (MTC) devices which are embedded in equipment, vehicles, and the like, and which have no "user" or even user interface. The RAN comprises base stations (BSs), also known as eNB or gNB, which provide wireless radio communication service to the UEs and connect the UEs to the core network 16. The CN comprises several types of core network functions which are responsible for various functions such as handling the mobility of the UE, interconnecting to other data networks such as the Internet, packet routing and forwarding, authentication, billing, and many other responsibilities.

Wireless cellular communication networks, also referred to herein as mobile networks, are operated by the so-called mobile network operators (MNOs). To use a particular mobile network offered by a particular MNO, users are required to have a contractual relationship with that MNO, that relationship being generally called the subscription.

In simple terms, the business model works as follows. The MNOs provide services to the users with valid subscriptions. These users use the services, e.g., send and receive Short Message System (SMS) messages (commonly called "texting"), make and receive phone calls, and access the Internet. The MNOs charge these users for the services they have used through the MNOs' billing or charging systems. The users pay according to the billed amount.

This business model is supported by several security features built into the mobile networks. For example, the network can authenticate the users and determine if they have valid subscriptions. The traffic belonging to services such as SMS, phone calls, internet data, are transported in secure way so that the users are billed correctly according to their usage of the traffic.

Network traffic may be classified into two general types—control plane (CP) and user plane (UP). The control plane traffic, used for management of traffic in the network, is also referred to as overhead. User plane traffic carries the actual data which is delivered to users. The secure transport of the traffic is achieved by confidentiality/ciphering and integrity protection. Confidentiality/ciphering in this context means encryption of messages, which makes it infeasible for unauthorized parties to decrypt and read the original messages. Integrity protection in this context means the sender adding a security token or a message authentication code (MAC) to a message that the receiver can verify, which makes it infeasible for unauthorized parties to tamper the original message without the receiver detecting the tampering.

A UE is typically connected to a single base station in order to use the mobile network services such phone calls, messaging, and data transmissions. When a UE does not have any data to send, its connection is idle.

For the UE to join a network, a registration procedure first takes place. The detailed registration procedure is outlined in § 4.2.2.2.2 "General Registration," of 3GPP Technical Standard (TS) 23.502, "Procedures for the 5G System;" Stage 2 (Release 15), version 16.0.2. Figure 4.2.2.2.2-1 of this section is reproduced as FIG. 2. As seen in FIG. 2, registration is to a network function known as the Access and Mobility Management Function (AMF).

A feature of 5G mobile networks is network slicing. Network slicing is an important capability to bring network resource utilization efficiency, deployment flexibility, and support fast growing over the top (OTT) application and services. A network slice is viewed as a logical end-to-end network that can be dynamically created. A given UE may access multiple slices over the same RAN. Each slice may serve a particular service type with agreed upon Service-level Agreement (SLA). A Network Slice is defined within a Public Land Mobile Network (PLMN) and includes the Core Network Control Plane and User Plane Network Functions as well as the 5G Access Network (AN).

In some cases, due to slicing requirements or to AMF set deployment constraints, for example, a UE cannot continue to be served by the Initiating AMF with which it registered. This is detailed in TS 23.502 § 4.2.2.2.3 "Registration with AMF re-allocation" with Figure 4.2.2.2.3-1 of this section being reproduced as FIG. 3.

FIG. 4 shows a scenario for AMF re-allocation when the UE and the network share a 5G security context. The UE uses the 5G security context to protect the initial Registration Request message. The UE will include the complete initial Registration Request message with all its Information Elements (IEs)—ciphered—in a Non-Access Stratum (NAS) Container. The UE may have slicing information such a Network Slice Selection Assistance Information (NSSAI), which is included in the complete initial Registration Request message. The NAS Container is included in an initial Registration Request message together with the allowed cleartext IE's. The UE sends the Registration Request integrity protected and with a valid native 5G-GUTI included.

Based on the 5G-GUTI, the Initiating AMF invokes a Namf_Communication_UEContextTransfer operation towards an Old AMF. The Initiating AMF has re-route capability via RAN. The Old AMF verifies the integrity of the Registration Request message using the stored 5G security context. If the verification is successful, then the old AMF may perform horizontal Kamf derivation and then provide the new Kamf' key together with an indication keyAmfHDerivationInd to the Initiating AMF. The Initiating AMF cannot decrypt the NAS Container as it did not get the old Kamf key from the Old AMF. The Initiating AMF initiates a NAS Security Mode Command to the UE.

The Initiating AMF requests the UE to resend the complete Initiating Registration Request message in the NAS Security Mode Complete message. In addition, the Initiating AMF needs to indicate to the UE to perform horizontal derivation by including the keyAmfHDerivationInd parameter in the NAS Security Mode Command message in step 3 of FIG. 4. When the Target AMF receives the complete cleartext initial Registration Request which includes the Requested NSSAI's, then the Target AMF is able to contact the NSSF with the Requested NSSAI's in order to obtain information about the Target AMF as described in steps 4a and 4b in FIG. 3.

There currently exist certain challenges. For example, consider the AMF re-allocation procedure outlined in FIG. 3. In this deployment, the Initiating AMF may not always be able to serve the UE as previously described due, for example, to slicing requirements or AMF set deployment constraints. The Initiating AMF requires the slicing information as 'Requested NSSAI's' provided by the UE in order to look up for an appropriate AMF (steps 6a, 6b in FIG. 3).

According to 3GPP TS 33.501, "Non-Access-Stratum (NAS) protocol for 5G System (5GS);" Stage 3 (Release 15), version 16.0.2. if the UE has a 5G security context available, the UE will use that context to protect the initial Registration Request message. The initial Registration Request may have slicing information such a Network Slice Selection Assistance Information (NSSAI). The UE will include the complete initial Registration Request message with all its IE's ciphered in a NAS Container. The NAS Container is included in the initial Registration Request message together with the allowed cleartext IE's, as shown in the Step 1 of FIG. 5.

According to said TS 33.501 and 3GPP TDoc S3-191611, the Target AMF shall decrypt the NAS Container included in the initial Registration Request message after the Target AMF has retrieved the 5G security context from the Last Visited AMF. The Last Visited AMF is not allowed to decrypt the NAS Container even though it has the available 5G security context.

When the Target AMF has decrypted the NAS Container, then all IE's included in the Registration Request message are available in cleartext including the Requested NSSAI's.

However, if the Target AMF fetches the new $K_{AMF}'$ from the Last Visited AMF (receiving keyAmfChangeInd), then the Target AMF will not receive the old $K_{AMF}$ key from which the new $K_{AMF}'$ was derived. This implies that the Target AMF is not able to decrypt the content (i.e. the Registration Request message) included in the NAS Container. The Target AMF is not able to get hold of the cleartext Requested NSSAI's parameter included in the Registration Request message included in the NAS Container.

This implies that the Target AMF needs to initiate a NAS Security Mode Command procedure with the UE. In this case, as seen in steps 3 and 4 of FIG. 5, the Target AMF requests the UE to resend the complete initial Registration Request message (step 3) and receives the complete initial Registration Request message in the NAS Security Mode Complete message (step 4). Additionally, in step 3 of FIG. 5, the Target AMF indicates to the UE to perform horizontal derivation by including the keyAmfHDerivationInd parameter in the NAS Security Mode Command message.

The AMF re-allocation procedure could be optimized for the scenario when UE and network shares a 5G security context already, if the Initiating AMF has re-route capability via the RAN, is not able to serve the UE, and needs to reroute the UE to a different Target AMF.

SUMMARY

Embodiments of the present disclosure optimize the AMF re-allocation procedure for an Initial AMF that has reroute capability via a RAN. The optimization of the present embodiments is beneficial, for example, in scenarios where a UE already shares a 5G security context with in a "Last Serving" AMF that is different from the Initial AMF, and where the Initial AMF and the Last Serving AMF can communicate with each other via an interface.

In one embodiment, the present disclosure provides a method, implemented by a wireless device in a wireless communication network, for handling a Non-Access Stratum (NAS) Container during an Access and Mobility Management Function (AMF) procedure re-allocation for the wireless device. In this embodiment, the method comprises generating an NAS Container comprising slicing information associated with the wireless device, encrypting the NAS Container, and sending a registration request message to an AMF in the wireless communication network, wherein the registration request message comprises the encrypted NAS Container and a slicing indicator that indicates to the AMF that the NAS Container comprises the slicing information.

In another embodiment, the present disclosure provides a method, implemented by an Initiating Access and Mobility Management Function (AMF) in a wireless communication network, for handling a Non-Access Stratum (NAS) Container during AMF re-allocation for a wireless device. In this embodiment, the method comprises receiving a registration request message from the wireless device. The registration request message comprises an encrypted NAS Container that includes slicing information associated with the wireless device. The method also comprises sending a context transfer request message to a Last Serving AMF, wherein the context transfer request message comprises the registration request message and the encrypted NAS Container, receiving a context transfer response message from the Last Serving AMF, wherein the context transfer response message comprises a decrypted NAS Container, and routing the registration request via an Access Network (AN) to a Target AMF based on the slicing information in the decrypted NAS Container.

In another embodiment, the present disclosure provides a method, implemented by an Access and Mobility Management Function (AMF) in a wireless communication network, for handling a Non-Access Stratum (NAS) Container during AMF re-allocation for a wireless device. In this embodiment, the method comprises receiving a context transfer request message from an Initiating AMF, wherein the registration request message comprises a registration request message and an encrypted NAS Container having slicing information associated with a wireless device, verifying an integrity of the registration request message, decrypting the encrypted NAS Container responsive to verifying the integrity of the registration request message, and sending (158) a context transfer response message to the Initiating AMF, wherein the context transfer response message comprises the decrypted NAS Container.

In another embodiment, the present disclosure provides a wireless device in a wireless communication network. In this embodiment, the wireless device comprises an interface circuit configured for communication with one or more serving cells the wireless communication network and a processing circuit. In this embodiment, the processing circuit is configured to generate an NAS Container comprising slicing information associated with the wireless device, encrypt the NAS Container, and send a registration request message to an AMF in the wireless communication network, wherein the registration request message comprises the encrypted NAS Container and a slicing indicator that indicates to the AMF that the NAS Container comprises the slicing information.

In another embodiment, the present disclosure provides a wireless device in a wireless communication network configured to generate an NAS Container comprising slicing information associated with the wireless device, encrypt the NAS Container, and send a registration request message to an AMF in the wireless communication network, wherein the registration request message comprises the encrypted NAS Container and a slicing indicator that indicates to the AMF that the NAS Container comprises the slicing information.

In another embodiment, the present disclosure provides a non-transitory computer-readable storage medium having a computer program comprising executable instructions stored therein that, when executed by a processing circuit in a wireless device in a wireless communication network, causes the wireless device to generate an NAS Container comprising slicing information associated with the wireless device, encrypt the NAS Container, and send a registration request message to an AMF in the wireless communication network, wherein the registration request message comprises the encrypted NAS Container and a slicing indicator that indicates to the AMF that the NAS Container comprises the slicing information.

In another embodiment, the present disclosure provides an Initiating Access and Mobility Management Function (AMF) of a wireless communication network. In this embodiment, the Initiating AMF comprises an interface circuit configured for communication with one or more serving cells in the wireless communication network and a processing circuit. The processing circuit is configured to receive a registration request message from a wireless device, wherein the registration request message comprises an encrypted Non-Access Stratum (NAS) Container that includes slicing information associated with the wireless device, send a context transfer request message to a Last Serving AMF, wherein the context transfer request message comprises the registration request message and the encrypted NAS Container, receive a context transfer response message from the Last Serving AMF, wherein the context transfer response message comprises a decrypted NAS Container, and route the registration request via an Access Network (AN) to a Target AMF based on the slicing information in the decrypted NAS Container.

In another embodiment, the present disclosure provides an Initiating Access and Mobility Management Function (AMF) of a wireless communication network in which the AMF is configured to receive a registration request message from a wireless device, wherein the registration request message comprises an encrypted Non-Access Stratum (NAS) Container that includes slicing information associated with the wireless device, send a context transfer request message to a Last Serving AMF, wherein the context transfer request message comprises the registration request message and the encrypted NAS Container, receive a context transfer response message from the Last Serving AMF, wherein the context transfer response message comprises a decrypted NAS Container, and route the registration request via an Access Network (AN) to a Target AMF based on the slicing information in the decrypted NAS Container.

In another embodiment, the present disclosure provides a non-transitory computer-readable storage medium having a computer program comprising executable instructions stored therein that, when executed by a processing circuit in an Initiating Access and Mobility Management Function (AMF) of a wireless communication network, causes the AMF to receive a registration request message from a wireless device, wherein the registration request message comprises an encrypted Non-Access Stratum (NAS) Container that includes slicing information associated with the wireless device, send a context transfer request message to a Last Serving AMF, wherein the context transfer request message comprises the registration request message and the encrypted NAS Container, receive a context transfer response message from the Last Serving AMF, wherein the context transfer response message comprises a decrypted NAS Container, and route the registration request via an Access Network (AN) to a Target AMF based on the slicing information in the decrypted NAS Container.

In another embodiment, the present disclosure provides an Access and Mobility Management Function (AMF) in a wireless communication network for handling a Non-Access Stratum (NAS) Container during AMF re-allocation for a wireless device. In this embodiment, the AMF comprises an interface circuit configured for communication with one or more serving cells the wireless communication network and a processing circuit. The processing circuit is configured to receive (152) a context transfer request message from an Initiating AMF, wherein the registration request message comprises a registration request message and an encrypted NAS Container having slicing information associated with a wireless device, verify an integrity of the registration request message, decrypt the encrypted NAS Container responsive to verifying the integrity of the registration request message, and send a context transfer response message to the Initiating AMF, wherein the context transfer response message comprises the decrypted NAS Container.

In another embodiment, the present disclosure provides an Access and Mobility Management Function (AMF) in a wireless communication network for handling a Non-Access Stratum (NAS) Container during AMF re-allocation for a wireless device. The AMF is configured to receive a context transfer request message from an Initiating AMF, wherein the registration request message comprises a registration request message and an encrypted NAS Container having slicing information associated with a wireless device, verify an integrity of the registration request message, decrypt the encrypted NAS Container responsive to verifying the integrity of the registration request message, and send a context transfer response message to the Initiating AMF, wherein the context transfer response message comprises the decrypted NAS Container.

In another embodiment, the present disclosure provides an non-transitory computer-readable storage medium having a computer program comprising executable instructions stored therein that, when executed by a processing circuit in an Access and Mobility Management Function (AMF) in a wireless communication network, causes the AMF to receive a context transfer request message from an Initiating AMF, wherein the registration request message comprises a registration request message and an encrypted NAS Container having slicing information associated with a wireless device, verify an integrity of the registration request message, decrypt the encrypted NAS Container responsive to verifying the integrity of the registration request message, and send a context transfer response message to the Initiating AMF, wherein the context transfer response message comprises the decrypted NAS Container.

DETAILED DESCRIPTION

Certain aspects of the present disclosure and their embodiments may provide solutions to these or other challenges. For example, 3GPP SA3-group has approved a CR (Change Request) in TDoc S3-191611 clarifying that the target AMF deciphers the NAS Container after the target AMF has retrieved the 5G NAS security context from the source AMF. If the target AMF receives a 5G NAS security context indicating keyAmfChangeInd from the source AMF, then the target AMF cannot decipher the initial Registration Request included in the NAS Container directly. In these cases, the AMF needs to initiate a NAS SMC procedure to indicate to the UE to derive the new 5G security context by performing horizontal $K_{AMF}$ derivation, and requests the UE to re-send the complete initial Registration Request message.

However, with AMF re-allocation due to slicing, if the source AMF would have decrypted the initial Registration Request included in the NAS Container instead of the target AMF, and provided the decrypted Registration Request to the target AMF, then the target AMF would have the decrypted Requested NSSAI's available and would not need to run a NAS SMC procedure with the UE.

The embodiments described herein optimize the AMF re-allocation procedure for an Initiating AMF that has reroute capability via a RAN. Such optimization is beneficial, for example, in scenarios where a UE already shares a 5G security context with in a "Last Serving" AMF that is different from the Initiating AMF, and where the Initiating AMF and the Last Serving AMF have an interface. Additionally, certain embodiments is beneficial because they optimize the AMF re-allocation procedure without impacting UE's configured to operate according to Release 15 of 3GPP TS 33.501. As described in more detail later, the optimization procedures described herein require only an update of the interface between AMFs, such as the Initiating and Target AMFs.

First Embodiment

Figure 6:
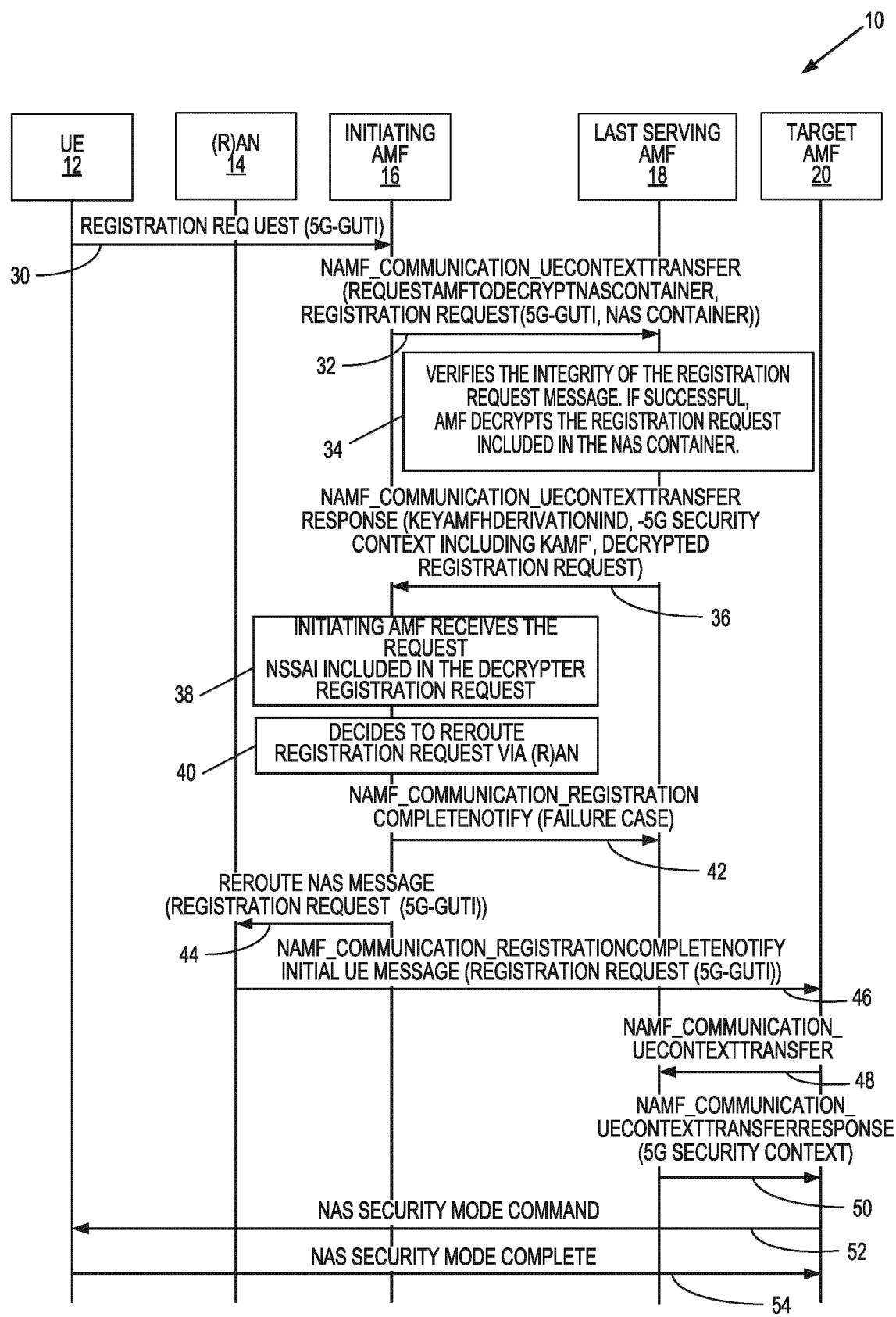
FIG. 6 is a signaling diagram illustrating a method for handling an NAS Container during an AMF re-allocation procedure, according to one embodiment.

Turning now to the drawings, FIG. 6 is a signaling diagram illustrating a method 10 for optimizing an AMF reallocation procedure according to one embodiment. As seen in FIG. 6, method 10 shows the signaling that occurs between a UE 12, an access network (AN) such as RAN 14, an Initiating AMF 16, a Last Serving AMF 18, and a Target AMF 20. This embodiment of the present disclosure is based on the observation that even though a UE 12 and the network already share a 5G security context, the network function that holds the 5G security context (i.e., the Last Serving AMF 18) is not allowed to decrypt a complete initial Registration Request included in an NAS Container which is further included in an initial Registration Request message.

In method 10, the initial Registration Request may have slicing information, such a Network Slice Selection Assistance Information (NSSAI). The UE 12 includes the complete initial Registration Request message with all of its IE's—ciphered—in an NAS Container. As previously described, this NAS Container is included in the initial Registration Request, which is included in an initial Registration Request message together with the allowed cleartext IE's. The UE 12 then sends the Registration Request integrity protected and with a valid native 5G-GUTI included to the Initiating AMF 16 (line 30).

The Initiating AMF 16 invokes, based on the 5G-GUTI, a Namf_Communication_UEContextTransfer operation towards the Last Serving AMF 18 (line 32). The Initiating AMF 16, which has re-route capability via RAN 14, includes the initial Registration Request message (including the NAS Container) received from UE 12 together with a new indication named RequestAMFToDecryptNASContainer to the Last Serving AMF 18. The new indication, named RequestAMFToDecryptNASContainer, indicates to the Last Serving AMF 18 to decrypt the NAS Container.

The Last Serving AMF 18 verifies the integrity of the Registration Request message using the stored 5G security context. Provided the verification is successful, and provided that the Last Serving AMF 18 has received the RequestAMFToDecryptNASContainer indication from the Initiating AMF 16, the Last Serving AMF 18 decrypts the NAS Container included in the Registration Request message (box 34).

The Last Serving AMF 18 sends a Namf_Communication_UEContextTransferResponse to the Initiating AMF 16 (line 36). In this response, the Last Serving AMF 18 includes the decrypted content in the NAS Container (i.e. the complete clear text Registration Request message) to the Initiating AMF 16.

Figure 1:
FIG. 1 illustrates an exemplary wireless communication network.
Figure 2:
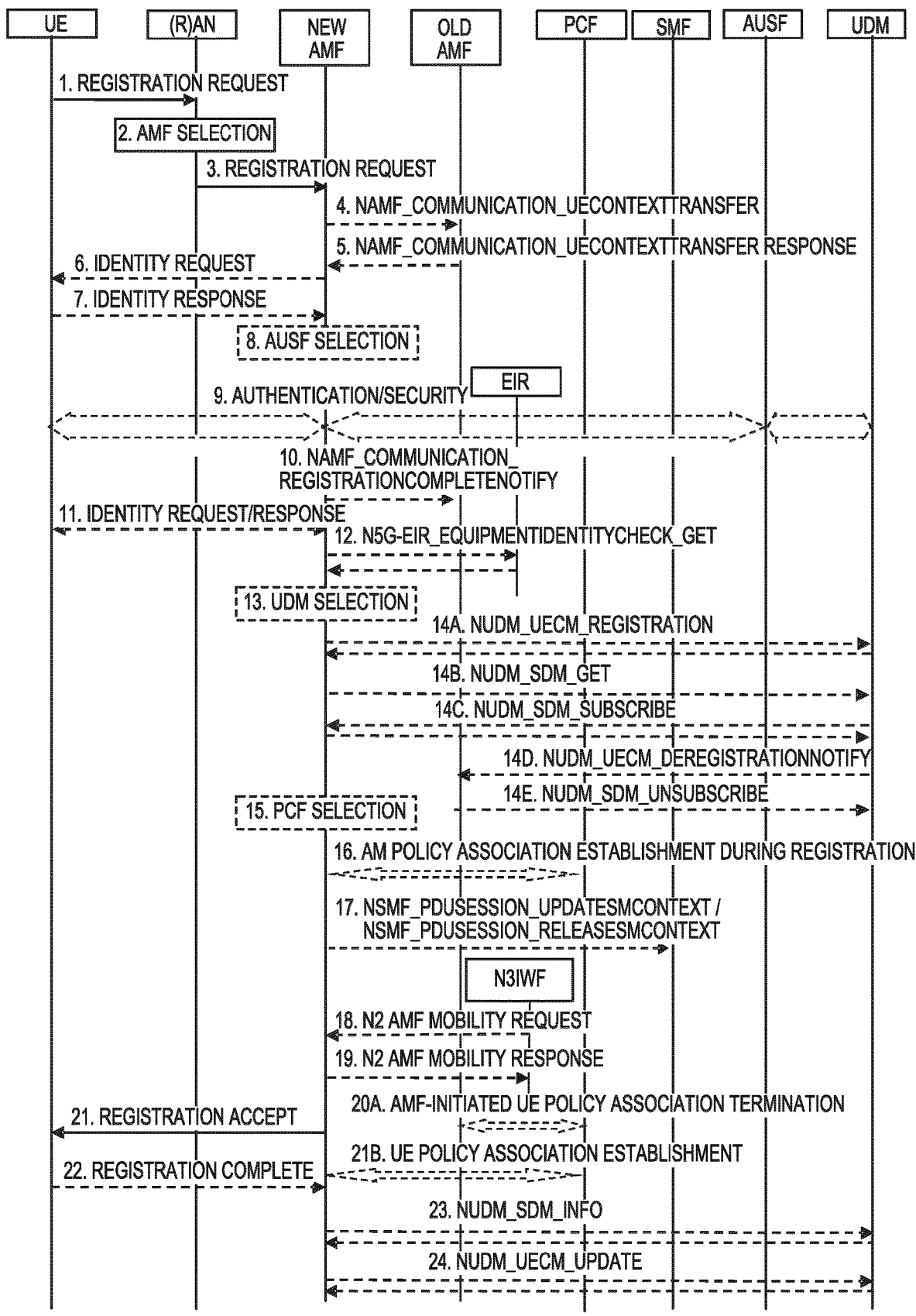
FIG. 2 is a signaling diagram illustrating a general AMF registration procedure.
Figure 3:
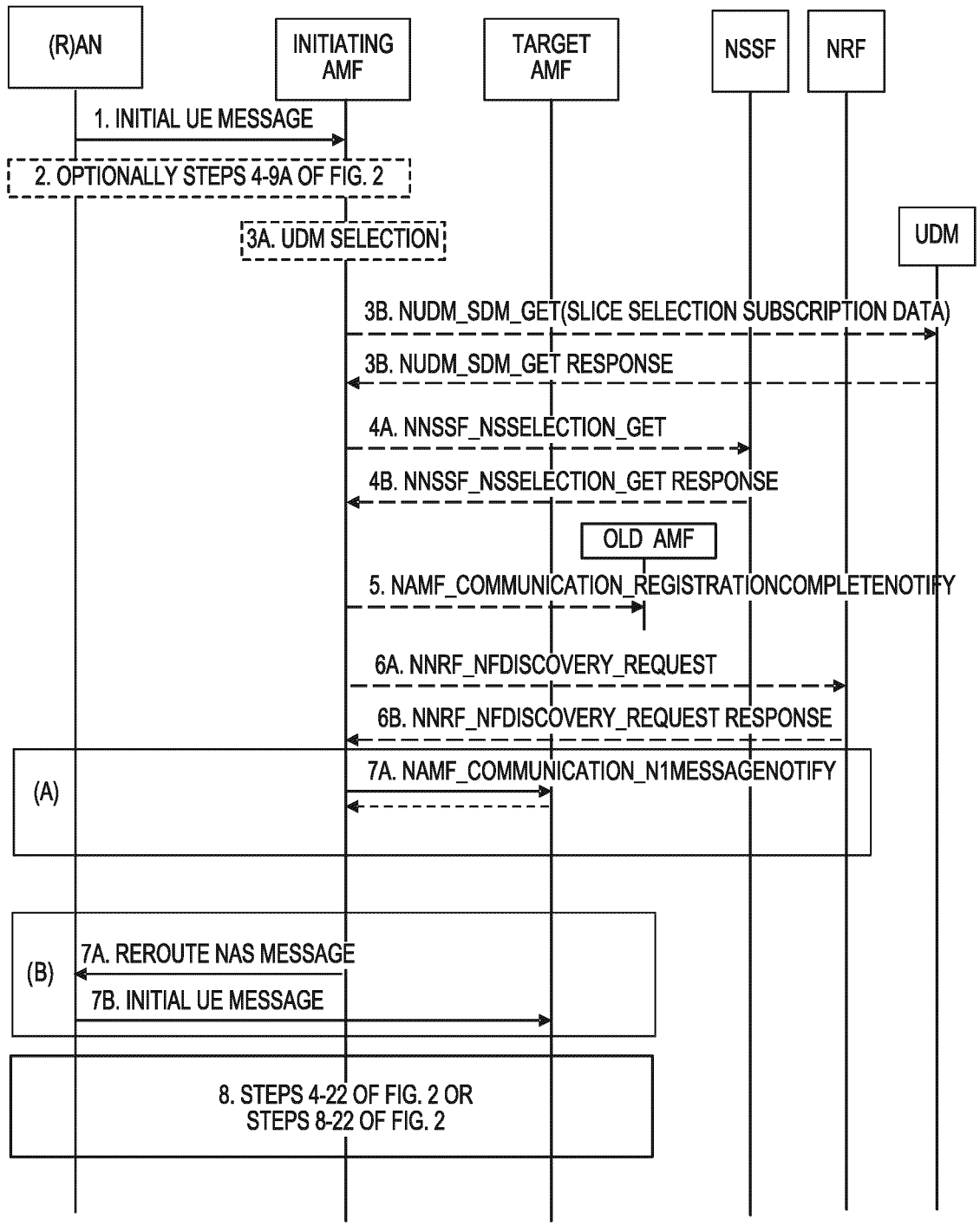
FIG. 3 is a signaling diagram illustrating an AMF reallocation procedure.
Figure 4:
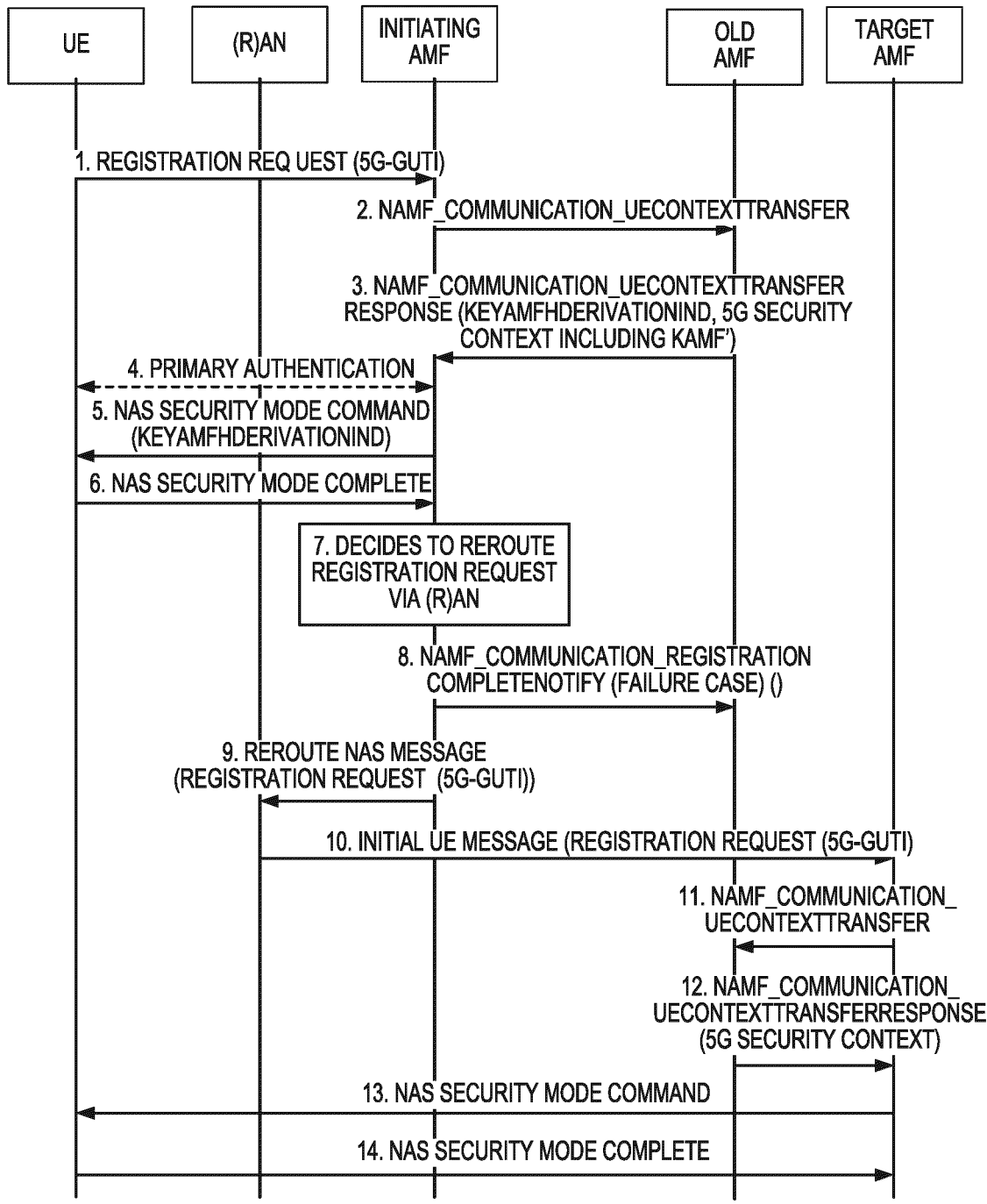
FIG. 4 is a signaling diagram illustrating an AMF reallocation procedure in cases where a UE and the wireless network already share a 5G security context.
Figure 5:
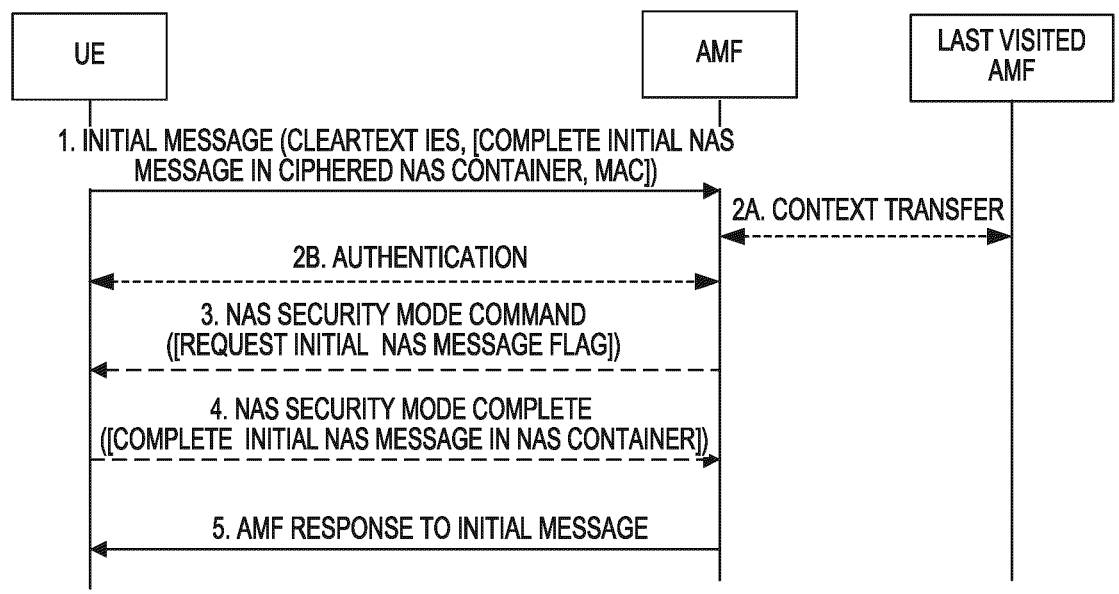
FIG. 5 is a signaling diagram illustrating a method for protecting an initial NAS message.

The Initiating AMF 16 receives the complete clear text Registration Request message from the Last Serving AMF 18 (box 38). The cleartext Registration Request message may contain the slicing information as the Requested NSSAI's' parameter in cleartext. The Initiating AMF 16 uses the 'Requested NSSAI's' in order to look up an appropriate AMF (steps 6*a*, 6*b* in FIG. 3).

The Initiating AMF 16 decides to reroute the Registration Request via the RAN 14 (box 40). When this occurs, the Initiating AMF 16 sends a Namf_Communication_RegistrationCompleteNotify message to the Last Serving AMF 18 (line 42), and sends a reroute NAS message, including the Registration Request received from the UE, to the RAN 14 (line 44). In response, the RAN 14 sends a Namf_Communication_RegistrationCompleteNotify message to the Target AMF 20 (line 46), which then sends a Namf_Communication_UEContextTransfer message to the Last Serving AMF 18 (line 48). In response, the Last Serving AMF 18 sends a Namf_Communication_UEContextTransfer Response, in which the 5G security context is included, to the Target AMF 20 (line 50). The Target AMF 20 can then send a NAS Security Mode Command message to the UE 12 (line 52), which then responds to the Target AMF 20 with a NAS Security Mode Complete message (line 54).

Second Embodiment

Figure 7:
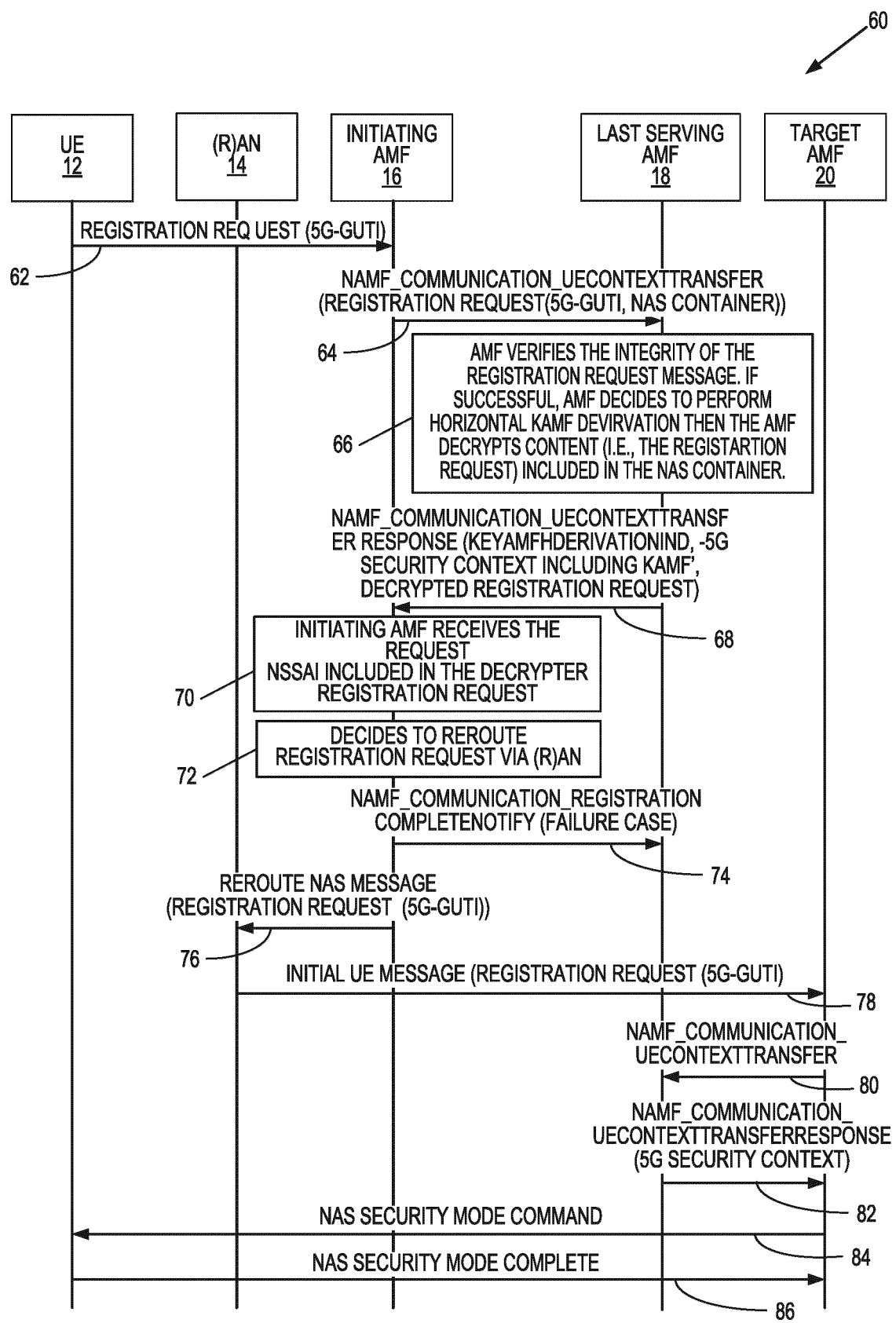
FIG. 7 is a signaling diagram illustrating a method for handling an NAS Container during an AMF re-allocation procedure, according to another embodiment.

FIG. 7 is a signaling diagram illustrating a method 60 for optimizing an AMF reallocation procedure according to another embodiment of the present disclosure. As in FIG. 6, this embodiment is also based on the observation that the network function holding the 5G security context (i.e., the Last Serving AMF 18) is not allowed to decrypt a complete initial Registration Request included in an NAS Container, which is further included in an initial Registration Request message, even though the UE 12 sending the Registration Request and the network already share a 5G security context.

However, this embodiment varies from the embodiment seen in FIG. 6 in that the Initiating AMF 16 of this embodiment does not provide an explicit RequestAMFToDecryptNASContainer indication to the Last Serving AMF 18. Rather, to avoid exposing the current $K_{AMF}$ key to the Initiating AMF 16, the Last Serving AMF 18 decrypts the content (i.e. the initial Registration Request message) in the NAS Container and provides the clear text content to the Initiating AMF 16. This is performed by the Last Serving AMF 18 responsive to deciding to perform horizontal $K_{AMF}$ derivation of the current $K_{AMF}$.

In more detail, as seen in FIG. 7, the initial Registration Request may have slicing information such a Network Slice Selection Assistance Information (NSSAI). As in the previous embodiment, UE 12 includes the complete initial Registration Request message with all its IE's—ciphered—in a NAS Container, and includes the NAS Container in the initial Registration Request message as previously described. The NAS Container is included in an initial Registration Request message together with the allowed cleartext IE's. The UE 12 then sends the Registration Request, integrity protected, including a valid native 5G-GUTI (line 62).

Based on the 5G-GUTI, the Initiating AMF 16 invokes a Namf_Communication_UEContextTransfer operation towards the Last Serving AMF 18. The Initiating AMF 16 includes the initial Registration Request message (including the NAS Container) received from the UE 12 to the Last Serving AMF (line 64).

The Last Serving AMF 18 verifies the integrity of the Registration Request message using the stored 5G security context. If the Last Serving AMF 18 decides to perform horizontal $K_{AMF}$ derivation of the current $K_{AMF}$, then the Last Serving AMF 18 decrypts the content in the NAS Container included in the Registration Request message (box 66).

The Last Serving AMF 18 sends an Namf_Communication_UEContextTransferResponse to the Initiating AMF 16 (line 68). The Last Serving AMF 18 includes the decrypted content in the NAS Container (i.e. the content equals the complete clear text Registration Request message) to the Initiating AMF 16.

The Initiating AMF 16 receives the complete clear text Registration Request message from the Last Serving AMF 18 (box 70). The clear text Registration Request message may contain the slicing information as the Requested NSSAI's' parameter in clear text. Further, the Initiating AMF 16 uses the 'Requested NSSAI's' in order to look up for an appropriate AMF (see steps 6*a*, 6*b* in FIG. 3).

Box 72 and lines 74-86 are similar to box 40 and lines 42-54 described previously described with respect to the embodiment of FIG. 6. In particular, the Initiating AMF 16 decides to reroute the Registration Request via the RAN 14 (box 72). When this occurs, the Initiating AMF 16 sends a Namf_Communication_RegistrationCompleteNotify message to the Last Serving AMF 18 (line 74), and sends a reroute NAS message, including the Registration Request received from the UE, to the RAN 14 (line 76). In response, the RAN 14 sends an Initial_UE_Message message, including the Registration Request, to the Target AMF 20 (line 78), which in response, sends a Namf_Communication_UEContextTransfer message to the Last Serving AMF 18 (line 80). In response, the Last Serving AMF 18 sends a Namf_Communication_UEContextTransferResponse to the Target AMF 20, in which the 5G security context is included (line 82). The Target AMF 20 can then send a NAS Security Mode Command message to the UE 12 (line 84), which then responds to the Target AMF 20 with a NAS Security Mode Complete message (line 86).

Third Embodiment

Figure 8:
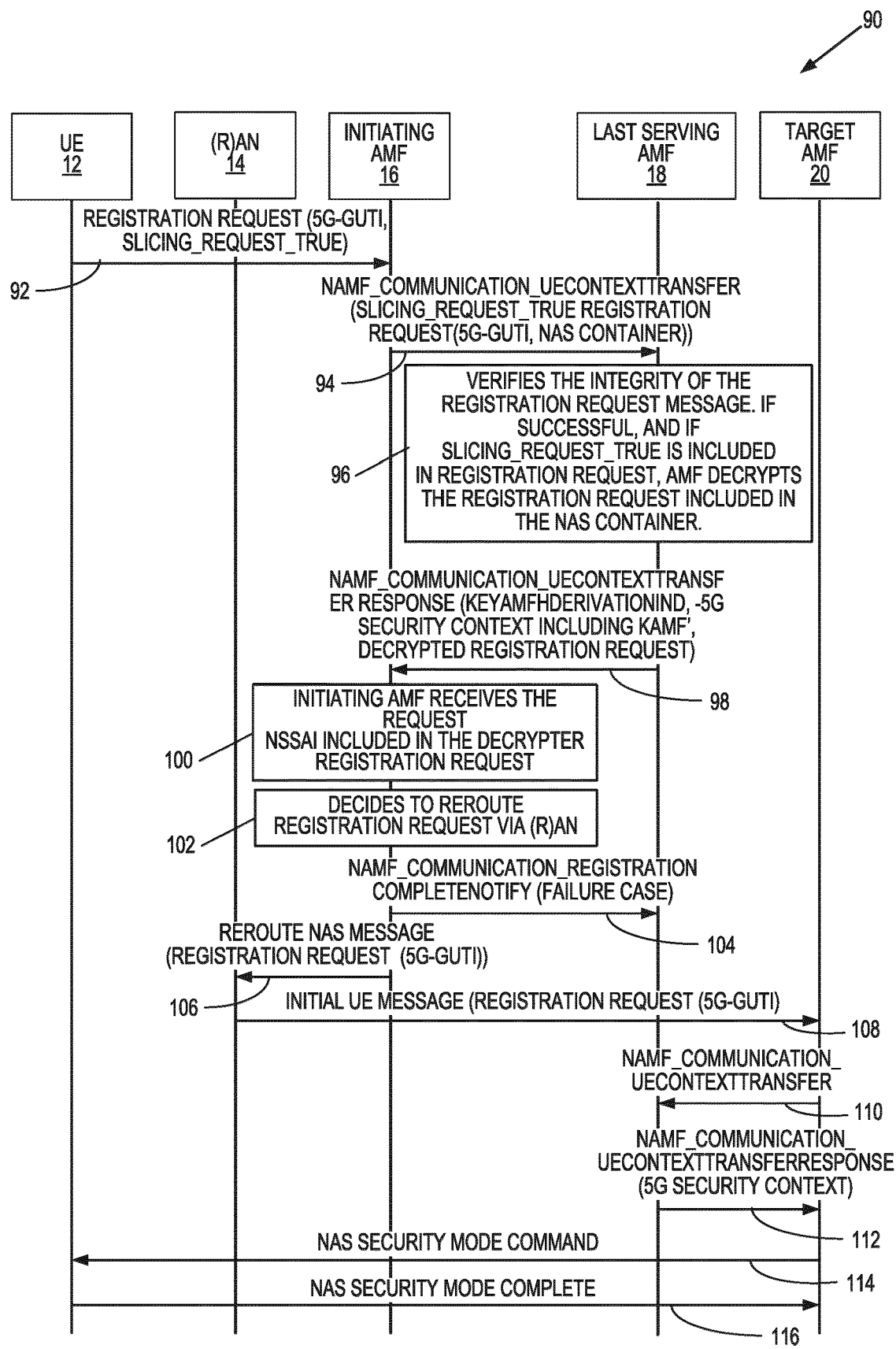
FIG. 8 is a signaling diagram illustrating a method for handling an NAS Container during an AMF re-allocation procedure, according to one embodiment.

FIG. 8 is a signaling diagram illustrating a method 90 for optimizing an AMF reallocation procedure according to another embodiment of the present disclosure. Like FIG. 6, the embodiment seen in FIG. 8 is based on the observation that the network function holding the 5G security context (i.e., the Last Serving AMF 18) is not allowed to decrypt a complete initial Registration Request included in an NAS Container, which is further included in an initial Registration Request message, even though the UE 12 sending the Registration Request and the network already share a 5G security context. However, as seen in FIG. 8, there are differences.

In more detail, the initial Registration Request may have slicing information such a Network Slice Selection Assistance Information (NSSAI). In these cases, then, the UE 12 includes a clear-text IE in the initial Registration Request indicating that the UE 12 has slicing information included in the Registration Request message. This clear-text IE could, for example, comprise a flag 'Slicing_Request_TRUE'. Additionally, UE 12 will include a complete initial Registration Request message with all its IE's—ciphered—in a NAS Container. The NAS Container is then included into the initial Registration Request, as previously described, and placed into an initial Registration Request message together with the allowed cleartext IE's. The UE 12 then sends the Registration Request, integrity protected, with a valid native 5G-GUTI (line 92).

The Initiating AMF 16 invokes a Namf_Communication_UEContextTransfer operation towards the Last Serving AMF 18 based on the 5G-GUTI (line 94). The Initiating AMF 16 includes the initial Registration Request message (including the NAS Container) received from the UE 12. Additionally, the 'Slicing_Request_TRUE' flag received from the UE 12 will be transferred in the context transfer request in clear-text to the Last Serving AMF 18.

The Last Serving AMF 18 verifies the integrity of the Registration Request message using the stored 5G security context. If the verification is successful, and if the Last Serving AMF 18 received the flag named 'Slicing_Request_TRUE' from the Initiating AMF 16, the Last Serving AMF 18 decrypts the NAS Container included in the Registration Request message (box 96).

In this embodiment, there are two different ways the Last Serving AMF 18 can proceed.
 Option 1: The Last Serving AMF 18 does not forward the current 5G security context to the Initiating AMF 16 if the Last Serving AMF 18 knows that an AMF re-allocation will take place;
 Option 2: The Last Serving AMF 18 either forwards the current 5G security context to the Initiating AMF 16, or performs a horizontal $K_{AMF}$ derivation of the current $K_{AMF}$ and the output key (i.e. the new $K_{AMF}'$ key is transferred to the Initiating AMF 16).

The Last Serving AMF 18 invokes a Namf_Communication_UEContextTransferResponse to the Initiating AMF 16 (line 98). The Last Serving AMF 18 includes the decrypted content in the NAS Container (i.e. the complete clear text Registration Request message) to the Initiating AMF 16.

The Initiating AMF 16 receives the complete clear text Registration Request message from the Last Serving AMF 18 (box 100). In this embodiment, the clear text Registration Request message may comprise the slicing information as the Requested NSSAI's' parameter in clear text. The Initiating AMF 16 uses the 'Requested NSSAI's' in order to search for an appropriate AMF (steps 6a, 6b in FIG. 3).

Box 102 and lines 104-116 are similar to box 40 and lines 42-54, respectively, described previously with respect to the embodiment of FIG. 6. In particular, the Initiating AMF 16 decides to reroute the Registration Request via the RAN 14 (box 102). When this occurs, the Initiating AMF 16 sends a Namf_Communication_RegistrationCompleteNotify message to the Last Serving AMF 18 (line 104), and sends a reroute NAS message, including the Registration Request received from the UE, to the RAN 14 (line 106). In response, the RAN 14 sends an Initial_UE_Message message, including the Registration Request, to the Target AMF 20 (line 108), which in response, sends a Namf_Communication_UEContextTransfer message to the Last Serving AMF 18 (line 110). In response, the Last Serving AMF 18 sends a Namf_Communication_UEContextTransferResponse message to the Target AMF 20, in which the 5G security context is included (line 112). The Target AMF 20 can then send a NAS Security Mode Command message to the UE 12 (line 114), which then responds to the Target AMF 20 with a NAS Security Mode Complete message (line 116).

Fourth Embodiment

In a fourth embodiment, the present disclosure proposes allowing cleartext UE indications to initiate an AMF re-allocation procedure. This embodiment is also based on the observation that the network function holding the 5G security context (i.e., the Last Serving AMF 18) is not allowed to decrypt a complete initial Registration Request included in an NAS Container, which is further included in an initial Registration Request message, even though the UE 12 sending the Registration Request and the network already share a 5G security context.

In more detail, this embodiment allows cleartext UE indications in future procedures to cause AMF re-allocation in cases of idle mobility, slicing, or any other new feature added in a later release. The network can decide to perform the context transfer only between the Initiating AMF 16 and the Last Serving AMF 18 according to AMF-reallocation priorities. Such priorities include, for example, handling mobility related AMF re-allocation, then handling slicing-related AMF re-allocation, then handling any new future potential AMF re-allocation, etc. If protected, the procedure provided in the Third Embodiment described above could protect a general future mechanism.

Fifth Embodiment

In a fifth embodiment, which may be applied to all previous embodiments, the Last Serving AMF 18 could transmit to the Initiating AMF 16 only the information that it needs to know. The information may be transmitted in clear text, and as in this case, may include the Requested NSSAI's IE. In other words, the Last Serving AMF 18 having the decryption keys extracts the need-to-know information for the next AMF (e.g., see boxes 34, 66, and 69 in FIGS. 6-8, respectively), and sends only this information in cleartext.

Figure 9:
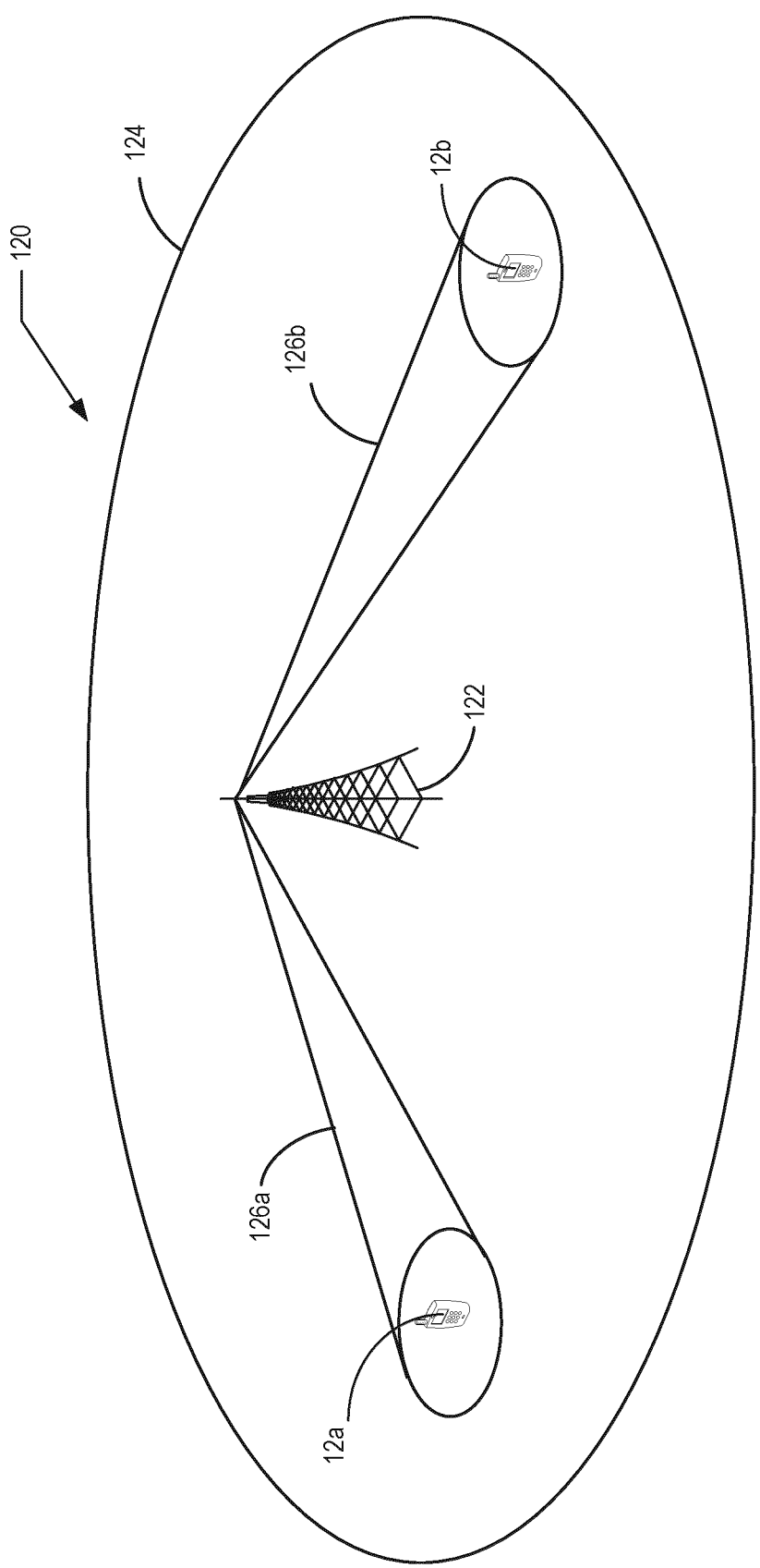
FIG. 9 illustrates an exemplary wireless network according to an embodiment of the present disclosure.

Referring now to FIG. 9, an exemplary embodiment of the disclosure will be described in the context of a 5G or NR wireless communication network. Those skilled in the art will appreciate that the methods and apparatus herein described are not limited to use in 5G or NR networks, but may also be used in wireless communication networks where multiple beams within a single cell are used for communication with wireless devices in the cell.

FIG. 9 illustrates a wireless communication network 120 according to the NR standard currently being developed by Third Generation Partnership Project (3GPP). The wireless communication network 50 comprises one or more base stations 122 providing service to user equipment (UEs) 200 in respective cells 124. The base stations 122 are also referred to as Evolved NodesBs (eNBs) and gNodeBs (gNBs) in 3GPP standards. Although only one cell 124 and one base station 122 are shown in FIG. 9, those skilled in the art will appreciate that a typical wireless communication network 120 comprises many cells 124 served by many base stations 122. One feature of NR networks is the ability of the base stations 122 to transmit and/or receive on multiple beams in the same cell 124. FIG. 9 illustrates two beams 126a, 126b (collectively 126), although the number of beams 126 in a cell 124 may be different.

The UEs 12a, 12b may comprise any type of equipment capable of communicating with the base station 122 over a wireless communication channel. For example, the UEs 12a, 12b may comprise cellular telephones, smart phones, laptop computers, notebook computers, tablets, machine-to-machine (M2M) devices (also known as machine type communication (MTC) devices), embedded devices, wireless sensors, or other types of wireless end user devices capable of communicating over wireless communication networks 120.

Figure 10:
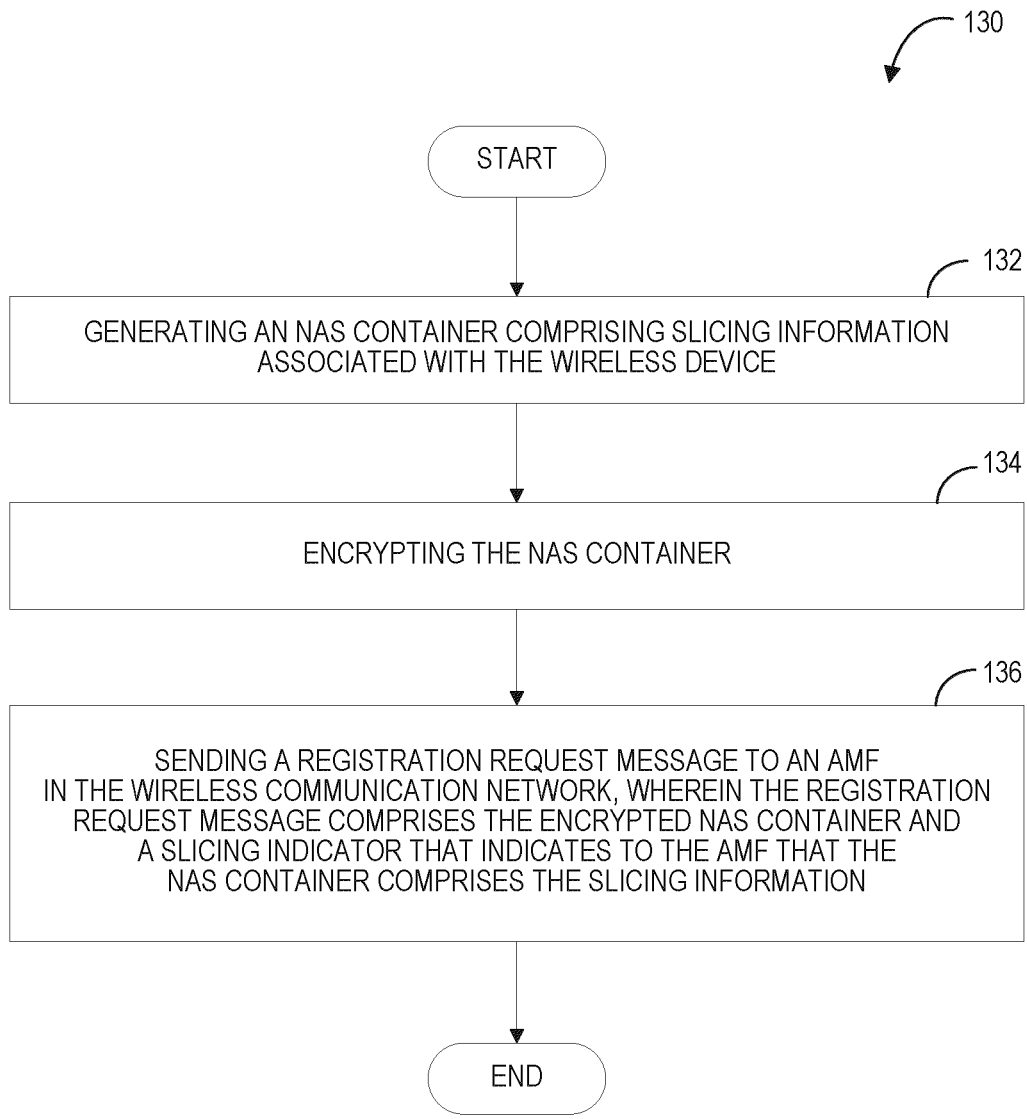
FIG. 10 illustrates an exemplary method for performing the present embodiments implemented by a UE according to an embodiment.

FIG. 10 illustrates an exemplary method 130 for handling a Non-Access Stratum (NAS) Container during AMF re-allocation for a wireless device according to one embodiment of the present disclosure. The method 130 of FIG. 10 is implemented by a wireless device (e.g., a cellular device) in a wireless communication network.

As seen in FIG. 10, method 130 begins with generating an NAS Container comprising slicing information associated with the wireless device (box 132). Method 130 then calls for encrypting the NAS Container (box 134), and sending a registration request message to an AMF in the wireless communication network (box 136). In this embodiment, the registration request message comprises the encrypted NAS Container and a slicing indicator (e.g., SLICING_RE-QUEST_TRUE) that indicates to the AMF that the NAS Container comprises the slicing information.

Figure 11:
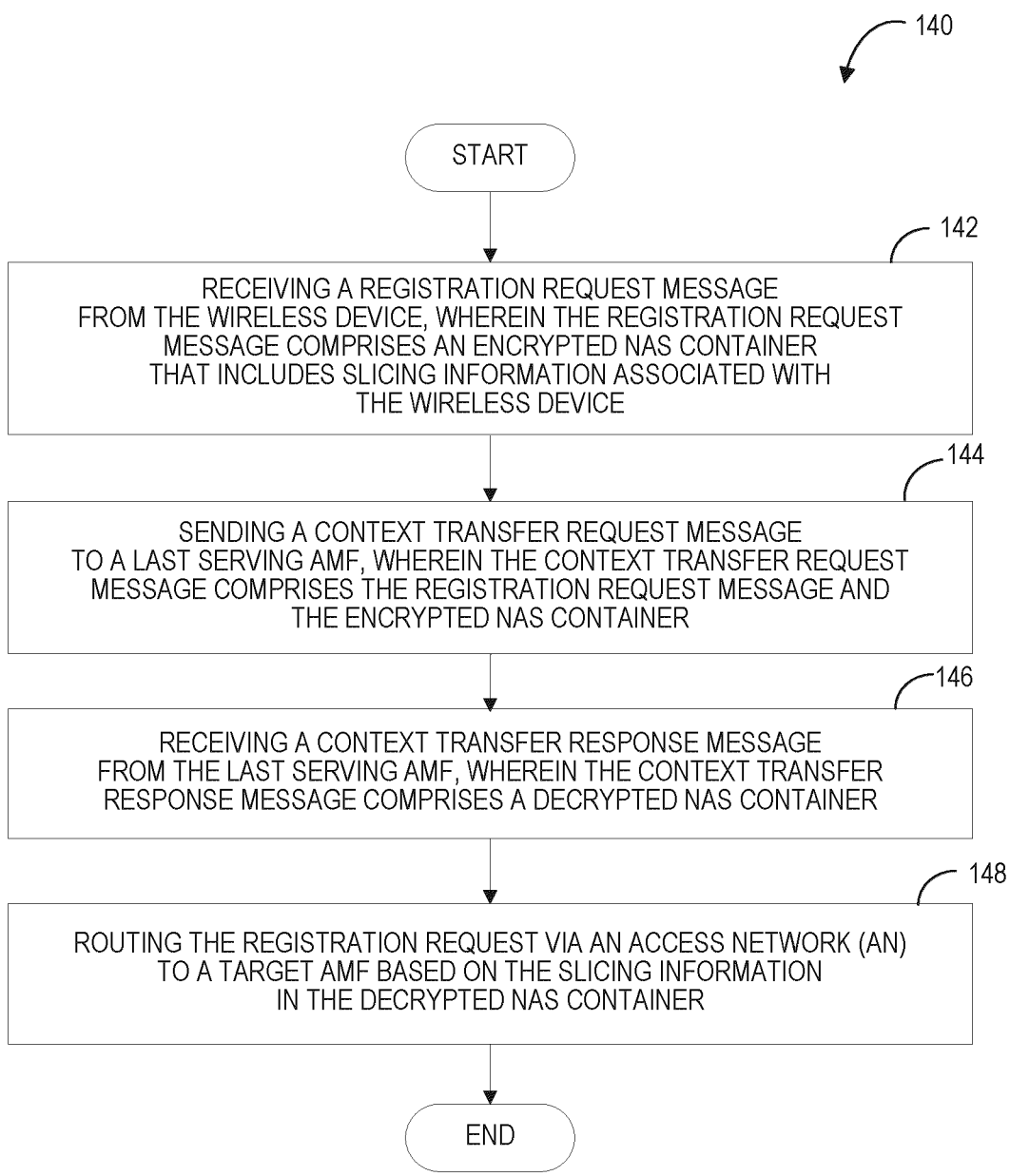
FIG. 11 illustrates an exemplary method for performing the present embodiments implemented by an initiating access mobility and management node according to an embodiment.

FIG. 11 illustrates an exemplary method 140 for handling a Non-Access Stratum (NAS) Container during AMF re-allocation for a wireless device according to one embodiment of the present disclosure. The method 140 of FIG. 11 is implemented by an Initiating Access and Mobility Management Function (AMF) in a wireless communication network.

As seen in FIG. 11, method 140 begins with receiving a registration request message from the wireless device, wherein the registration request message comprises an encrypted NAS Container that includes slicing information associated with the wireless device (box 142). Method 140 then calls for sending a context transfer request message to a Last Serving AMF, wherein the context transfer request message comprises the registration request message and the encrypted NAS Container (box 144), and receiving a context transfer response message from the Last Serving AMF. The context transfer request message comprises a decrypted NAS Container (box 146). Then, method 70 calls for routing the registration request via an Access Network (AN) to a Target AMF based on the slicing information in the decrypted NAS Container (box 148).

In some embodiments, method 140 also calls for sending a decryption request indicator (e.g., RequestAMFToDe-cryptNASContainer) in the context transfer request message to the Last Serving AMF. This indicator requests the Last Serving AMF to decrypt the encrypted NAS Container.

In some embodiments, method 140 further calls for receiving a slicing indicator (e.g., SLICING_REQUEST_TRUE) in the registration request message indicating that the NAS Container comprises the slicing information.

Additionally, in some embodiments, method 140 further calls for sending the slicing indicator to the Last Serving AMF in the context transfer request message.

In some embodiments, the AMF implementing method 140 has re-route capability. In at least one embodiment, the AMF implementing method 140 and the wireless device share a security context at the time the AMF receives the registration request message. In some embodiments, the context transfer response message received the Last Serving AMF 18 comprises the slicing information in clear text. In some embodiments, the slicing information comprises Network Slice Selection Assistance Information (NSSAI).

Figure 12:
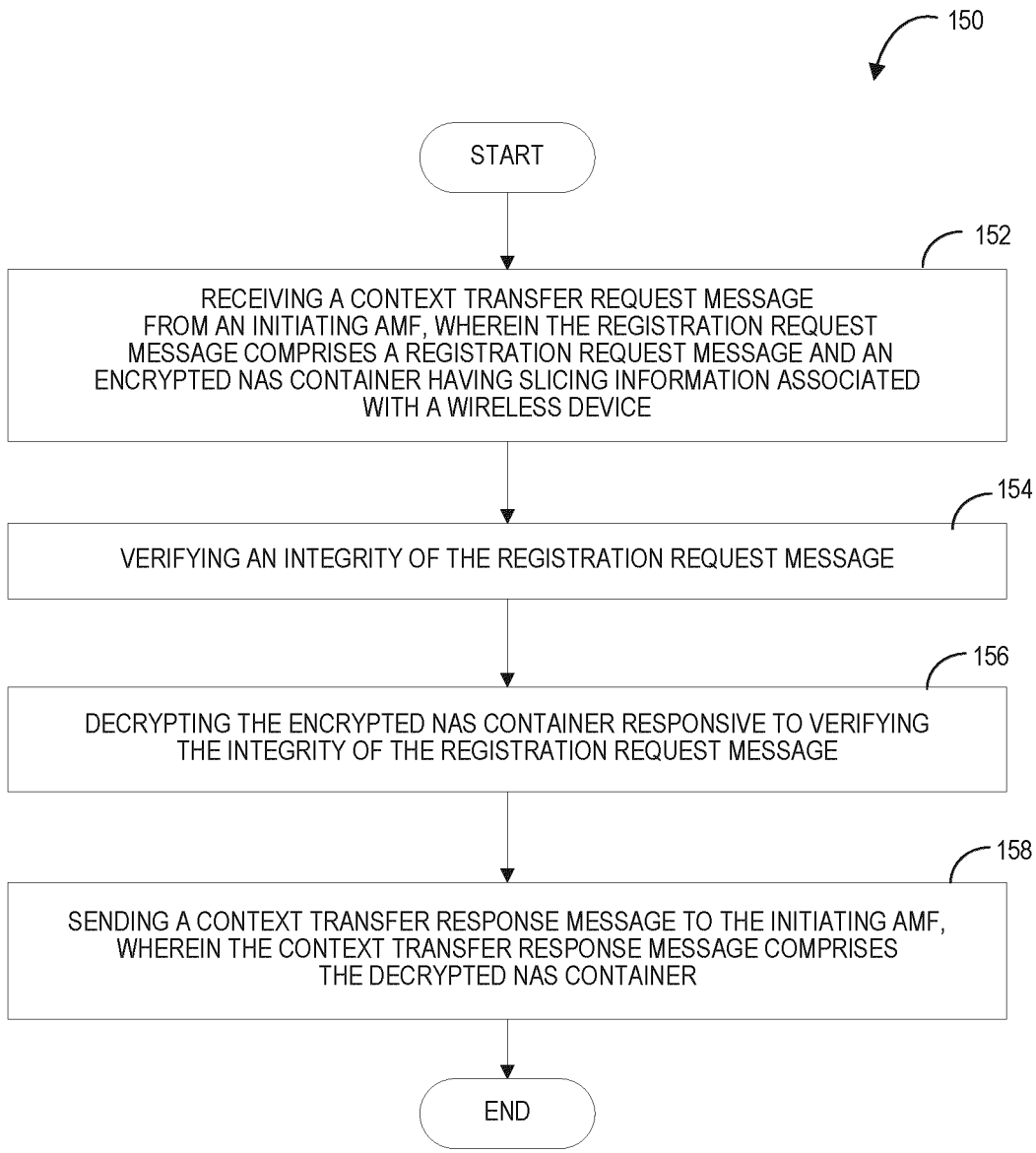
FIG. 12 illustrates another exemplary method for performing the present embodiments implemented by a last serving access mobility and management node according to an embodiment.

FIG. 12 illustrates an exemplary method 150 for handling a Non-Access Stratum (NAS) Container during AMF re-allocation for a wireless device according to one embodiment of the present disclosure. The method 150 of FIG. 12 is implemented by a Last Serving Access and Mobility Management Function (AMF) in a wireless communication network.

As seen in FIG. 12, method 150 begins with receiving a context transfer request message from an Initiating AMF. In this embodiment, the registration request message comprises a registration request message and an encrypted NAS Container having slicing information associated with a wireless device (box 152). Method 150 then calls for verifying an integrity of the registration request message (box 154). Provided the Last Serving AMF verifies the integrity of the registration request message, method 150 calls for decrypting the encrypted NAS Container (box 156) and sending a context transfer response message to the Initiating AMF box 158). In these embodiments, the context transfer response message comprises the decrypted NAS Container.

Some embodiments of method 150 call for decrypting the encrypted NAS Container responsive to receiving a decryption request indicator (e.g., RequestAMFToDecryptNAS-Container) in the context transfer request message from the Initiating AMF.

In some embodiments, decrypting the encrypted NAS Container comprises deriving a key $K_{AMF}$ responsive to verifying the integrity of the registration request message, and decrypting the encrypted NAS Container responsive to deriving the key $K_{AMF}$.

In some embodiments, decrypting the encrypted NAS Container further comprises decrypting the encrypted NAS Container responsive to receiving a slicing indicator (e.g., SLICING_REQUEST_TRUE) in the context transfer request message from the Initiating AMF.

Regardless of the particular embodiment, however, the AMF implementing method 150 has re-route capability, and shares a security context at the time the AMF receives the registration request message. In some embodiments, the context transfer response message received by the Last Serving AMF comprises the slicing information in clear text. In some embodiments, the slicing information comprises Network Slice Selection Assistance Information (NSSAI).

An apparatus can perform any of the methods herein described by implementing any functional means, modules, units, or circuitry. In one embodiment, for example, the apparatuses comprise respective circuits or circuitry configured to perform the steps shown in the method figures. The circuits or circuitry in this regard may comprise circuits dedicated to performing certain functional processing and/or one or more microprocessors in conjunction with memory. For instance, the circuitry may include one or more microprocessor or microcontrollers, as well as other digital hardware, which may include Digital Signal Processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory may include program instructions for executing one or more telecommunications and/or data communications protocols as well as instructions for carrying out one or more of the techniques described herein, in several embodiments. In embodiments that employ memory, the memory stores program code that, when executed by the one or more processors, carries out the techniques described herein.

Figure 13:
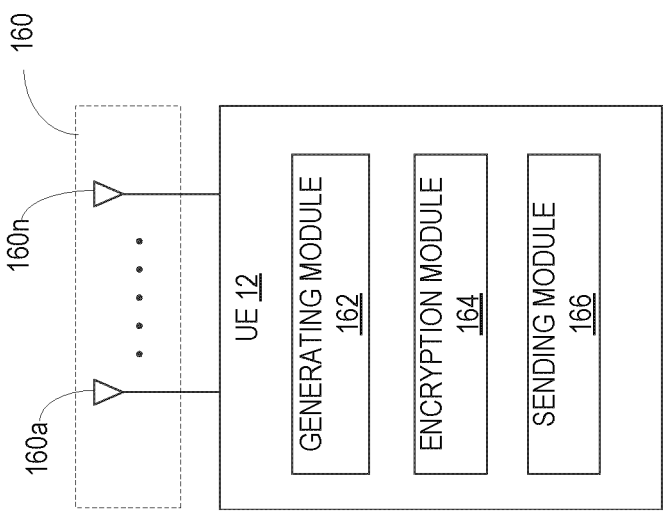
FIG. 13 is a schematic block diagram of an exemplary User Equipment (UE) according to one embodiment.

FIG. 13 illustrates a UE 12 in accordance with one or more embodiments. The UE 12 comprises an antenna array 160 comprising one or more antennas 160a . . . 160n, a generating module 162, an encryption module 164, and a sending module 166. The various modules 162, 164, and 166 can be implemented by hardware and/or by software code that is executed by one or more processors or processing circuits. The generating module 162 is configured to generate an NAS Container comprising slicing information associated with the wireless device. The encryption module 164 is configured to encrypt the NAS Container, and the sending module 166 is configured to send a registration request message to an AMF in the wireless communication network. In these embodiments, the registration request message comprises the encrypted NAS Container and a slicing indicator that indicates to the AMF that the NAS Container comprises the slicing information.

Figure 14:
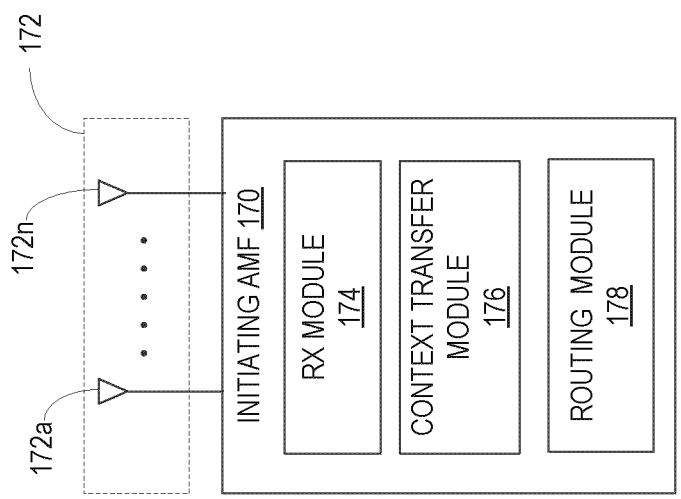
FIG. 14 is a schematic block diagram of an exemplary initiating access mobility and management node operating according to one embodiment.

FIG. 14 illustrates an Initiating AMF 170 in accordance with one or more embodiments.

The Initiating AMF 170 comprises an antenna array 172 comprising one or more antennas 172a . . . 172n, a receive module 174, a context transfer module 176, and a sending module 178. The various modules 174, 176 and 178 can be implemented by hardware and/or by software code that is executed by a processor or processing circuit. The receive module 174 is configured to receive a registration request message from the wireless device. In these embodiments, the registration request message comprises an encrypted NAS Container that includes slicing information associated with the wireless device. The context transfer module 176 is configured to send a context transfer request message to a Last Serving AMF, and to receive, in return, a context transfer response message from the Last Serving AMF. In accordance with the present embodiment, the context transfer request message send to the Last Serving AMF comprises the registration request message and the encrypted NAS Container. The context transfer response message received from the Last Serving AMF comprises a decrypted NAS Container. The routing module 178 is configured to route the registration request via an Access Network (AN) to a Target AMF based on the slicing information in the decrypted NAS Container.

Figure 15:
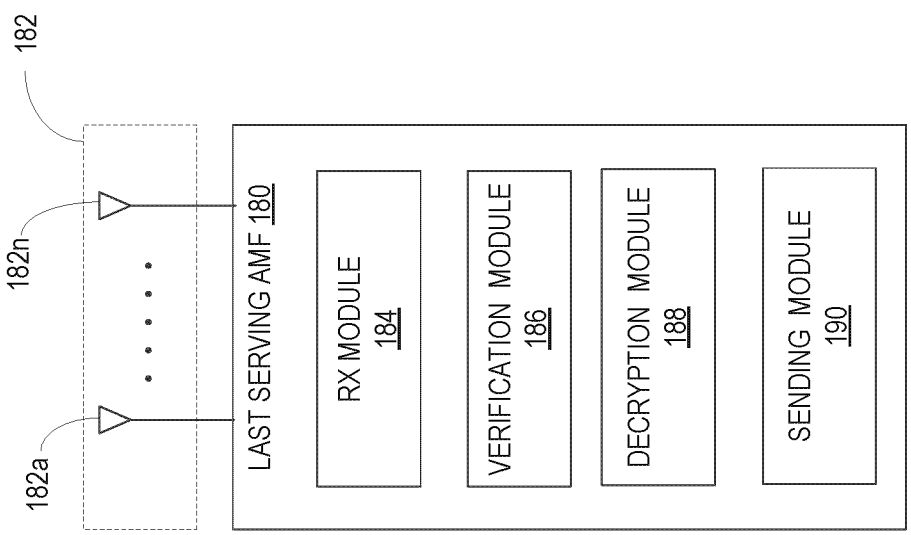
FIG. 15 is a schematic block diagram of an exemplary last serving access mobility and management node operating according to another embodiment.

FIG. 15 illustrates an AMF 180 in accordance with one or more embodiments. In this embodiment, the AMF 180 is configured to function as a Last Serving AMF 18.

The AMF 180 comprises an antenna array 182 comprising one or more antennas 182a . . . 182n, a receive module 184, a verification module 186, a decryption module 188, and a sending module 190. The various modules 184, 186, 188, and 190 can be implemented by hardware and/or by software code that is executed by a processor or processing circuit. The receive module 174 is configured to receive a context transfer request message from an Initiating AMF 170. The registration request message comprises a registration request message and an encrypted NAS Container having slicing information associated with a wireless device, such as UE 12. The verification module 186 is configured to verify an integrity of the registration request message. The decryption module 188 is configured to decrypt the encrypted NAS Container responsive to verifying the integrity of the registration request message. The sending module 190 is configured to send a context transfer response message to the Initiating AMF, wherein the context transfer response message comprises the decrypted NAS Container.

Figure 16:
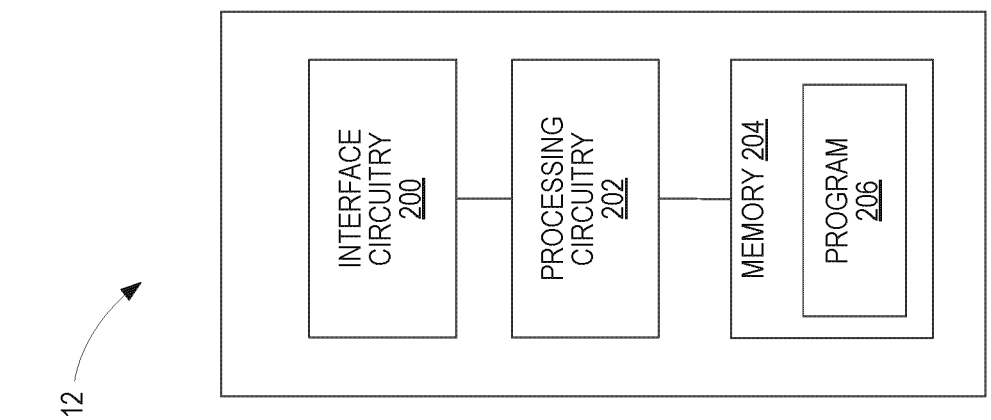
FIG. 16 is a functional block diagram of a UE configured to function according to an embodiment.

FIG. 16 illustrates some exemplary components of a UE 12 according to one embodiment. The UE 12 interface circuitry 200 coupled to one or more antennas, and comprises the radio frequency (RF) circuitry needed for transmitting and receiving signals over a wireless communication channel. The processing circuitry 202 controls the overall operation of the UE 12 and processes the signals transmitted to or received by the UE 12. Such processing includes coding and modulation of transmitted data signals, and the demodulation and decoding of received data signals. The processing circuitry 202 may comprise one or more microprocessors, hardware, firmware, or a combination thereof.

Memory 204 comprises both volatile and non-volatile memory for storing computer program code and data needed by the processing circuitry 202 for operation. Memory 204 may comprise any tangible, non-transitory computer-readable storage medium for storing data including electronic, magnetic, optical, electromagnetic, or semiconductor data storage. Memory 204 stores a computer program 206 comprising executable instructions that configure the processing circuitry 202 to implement method 130 of FIG. 10 as described herein. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 206 for configuring the processing circuitry 202 as herein described may be stored in a removable memory, such as a portable compact disc, portable digital video disc, or other removable media. The computer program 206 may also be embodied in a carrier such as an electronic signal, optical signal, radio signal, or computer readable storage medium.

Figure 17:
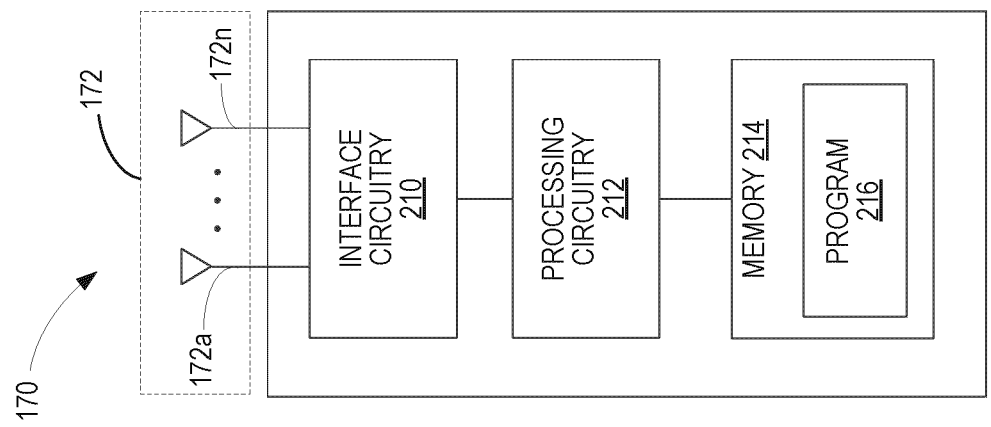
FIG. 17 is a functional block diagram of an initiating access mobility and management node configured to function according to an embodiment.

FIG. 17 illustrates some exemplary components of an Initiating AMF 170 according to one embodiment. The Initiating AMF 170 comprises an antenna array 172 with multiple antenna elements 172a . . . 172n, interface circuitry 210, processing circuitry 212, and memory 214.

The interface circuitry 210 is coupled to the antennas 172a . . . 172n and comprises the radio frequency (RF) circuitry needed for transmitting and receiving signals over a wireless communication channel. The processing circuitry 212 controls the overall operation of the Initiating AMF 170 and processes the signals transmitted to or received by the Initiating AMF 170. Such processing includes coding and modulation of transmitted data signals, and the demodulation and decoding of received data signals. The processing circuitry 212 may comprise one or more microprocessors, hardware, firmware, or a combination thereof.

Memory 214 comprises both volatile and non-volatile memory for storing computer program code and data needed by the processing circuitry 212 for operation. Memory 214 may comprise any tangible, non-transitory computer-readable storage medium for storing data including electronic, magnetic, optical, electromagnetic, or semiconductor data storage. Memory 214 stores a computer program 216 comprising executable instructions that configure the processing circuitry 212 to implement method 140 of FIG. 11 as described herein. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 216 for configuring the processing circuitry 212 as herein described may be stored in a removable memory, such as a portable compact disc, portable digital video disc, or other removable media. The computer program 216 may also be embodied in a carrier such as an electronic signal, optical signal, radio signal, or computer readable storage medium.

Figure 18:
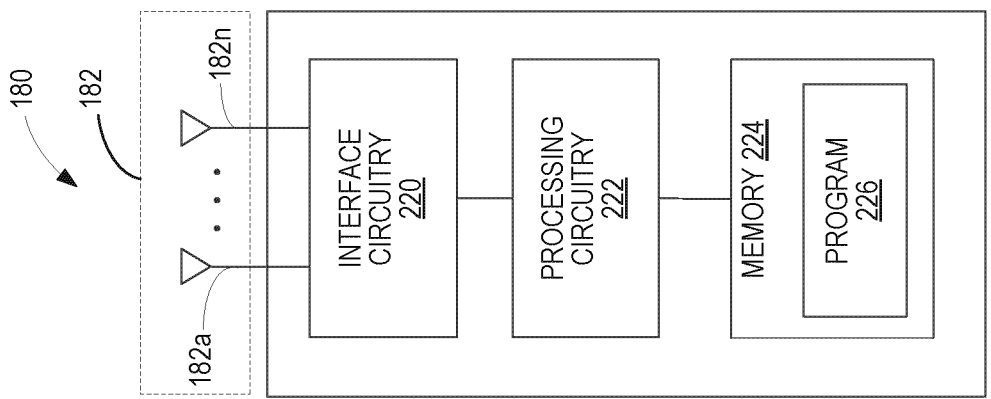
FIG. 18 is a functional block diagram of a last serving access mobility and management node configured to function according to an embodiment.

FIG. 18 illustrates some exemplary components of an AMF 180 according to one embodiment. According to the present disclosure, AMF 180 can be configured to function as a Last Serving AMF 18, but in any case, comprises an antenna array 182 with multiple antenna elements 182a . . . 182n, interface circuitry 220, processing circuitry 222, and memory 224.

The interface circuitry 220 is coupled to the antennas 182a . . . 182n and comprises the radio frequency (RF) circuitry needed for transmitting and receiving signals over a wireless communication channel. The processing circuitry 222 controls the overall operation of the AMF 180 and processes the signals transmitted to or received by the AMF 180. Such processing includes coding and modulation of transmitted data signals, and the demodulation and decoding of received data signals. The processing circuitry 222 may comprise one or more microprocessors, hardware, firmware, or a combination thereof.

Memory 224 comprises both volatile and non-volatile memory for storing computer program code and data needed by the processing circuitry 222 for operation. Memory 224 may comprise any tangible, non-transitory computer-readable storage medium for storing data including electronic, magnetic, optical, electromagnetic, or semiconductor data storage. Memory 224 stores a computer program 226 comprising executable instructions that configure the processing circuitry 222 to implement methods 150 according to FIG. 12, as described herein. In general, computer program instructions and configuration information are stored in a non-volatile memory, such as a ROM, erasable programmable read only memory (EPROM) or flash memory. Temporary data generated during operation may be stored in a volatile memory, such as a random access memory (RAM). In some embodiments, computer program 226 for configuring the processing circuit 222 as herein described may be stored in a removable memory, such as a portable compact disc, portable digital video disc, or other removable media. The computer program 226 may also be embodied in a carrier such as an electronic signal, optical signal, radio signal, or computer readable storage medium.

Those skilled in the art will also appreciate that embodiments herein further include corresponding computer programs. A computer program comprises instructions which, when executed on at least one processor of an apparatus, cause the apparatus to carry out any of the respective processing described above. A computer program in this regard may comprise one or more code modules corresponding to the means or units described above.

Embodiments further include a carrier containing such a computer program. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of an apparatus, cause the apparatus to perform as described above.

Embodiments further include a computer program product comprising program code portions for performing the steps of any of the embodiments herein when the computer program product is executed by a computing device. This computer program product may be stored on a computer readable recording medium.

Additional embodiments will now be described. At least some of these embodiments may be described as applicable in certain contexts and/or wireless network types for illustrative purposes, but the embodiments are similarly applicable in other contexts and/or wireless network types not explicitly described.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the description.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The invention claimed is:

1. A method, implemented by an Initiating Access and Mobility Management Function (AMF) in a wireless communication network, for handling a Non-Access Stratum (NAS) Container during AMF re-allocation for a wireless device, the method comprising:
   receiving a registration request message from the wireless device, wherein the registration request message comprises an encrypted NAS Container that includes slicing information associated with the wireless device;
   sending a context transfer request message to a Last Serving AMF, wherein the context transfer request message comprises the registration request message and the encrypted NAS Container;
   receiving a context transfer response message from the Last Serving AMF, wherein the context transfer response message comprises a decrypted NAS Container; and
   routing the registration request via an Access Network (AN) to a Target AMF based on the slicing information in the decrypted NAS Container.

2. The method of claim 1, wherein the context transfer request message to the Last Serving AMF includes a decryption request indicator requesting the Last Serving AMF to decrypt the encrypted NAS Container.

3. The method of claim 1, wherein the registration request message further comprises a slicing indicator indicating that the NAS Container comprises the slicing information.

4. The method of claim 3, wherein the context transfer request message send to the Last Serving AMF includes the slicing indicator.

5. The method of claim 1, wherein the Initiating AMF has re-route capability.

6. The method of claim 1, wherein the Initiating AMF and the wireless device share a security context at when the Initiating AMF receives the registration request message.

7. The method of claim 1, wherein the context transfer response message from the Last Serving AMF comprises the slicing information in clear text.

8. The method of claim 1, wherein the slicing information comprises Network Slice Selection Assistance Information (NSSAI).

9. A method, implemented by an Access and Mobility Management Function (AMF) in a wireless communication network, for handling a Non-Access Stratum (NAS) Container during AMF re-allocation for a wireless device, the method comprising:
   receiving a context transfer request message from an Initiating AMF, wherein the context transfer request message comprises a registration request message and an encrypted NAS Container having slicing information associated with a wireless device;
   verifying an integrity of the registration request message;
   decrypting the encrypted NAS Container responsive to verifying the integrity of the registration request message;
   sending a context transfer response message to the Initiating AMF, wherein the context transfer response message comprises the decrypted NAS Container.

10. The method of claim 9, wherein the encrypted NAS Container is decrypted responsive to receiving a decryption request indicator in the context transfer request message from the Initiating AMF.

11. The method of claim 9, wherein decrypting the encrypted NAS Container comprises:
   deriving a key KAMF responsive to verifying the integrity of the registration request message; and
   decrypting the encrypted NAS Container responsive to deriving the key KAMF.

12. The method of claim 11, wherein the encrypted NAS Container is decrypted responsive to receiving a slicing indicator in the context transfer request message from the Initiating AMF.

13. An Initiating Access and Mobility Management Function (AMF) of a wireless communication network, the AMF comprising:
   an interface circuit configured for communication with one or more serving cells the wireless communication network; and
   a processing circuit configured to:
      receive a registration request message from a wireless device, wherein the registration request message comprises an encrypted Non-Access Stratum (NAS) Container that includes slicing information associated with the wireless device;
      send a context transfer request message to a Last Serving AMF, wherein the context transfer request message comprises the registration request message and the encrypted NAS Container;
      receive a context transfer response message from the Last Serving AMF, wherein the context transfer response message comprises a decrypted NAS Container; and
      route the registration request via an Access Network (AN) to a Target AMF based on the slicing information in the decrypted NAS Container.

14. The Initiating AMF of claim 13, wherein the processing circuit is further configured to send a decryption request indicator in the context transfer request message to the Last Serving AMF requesting the Last Serving AMF to decrypt the encrypted NAS Container.

15. The Initiating AMF of claim 13, wherein the processing circuit is further configured to receive a slicing indicator in the registration request message indicating that the NAS Container comprises the slicing information.

16. The Initiating AMF of claim 15, wherein the processing circuit is further configured to send the slicing indicator to the Last Serving AMF in the context transfer request message.

17. The Initiating AMF of claim 13, wherein the Initiating AMF has re-route capability.

18. The Initiating AMF of claim 13, wherein the Initiating AMF and the wireless device share a security context at when the Initiating AMF receives the registration request message.

19. The Initiating AMF of claim 13, wherein the context transfer response message from the Last Serving AMF comprises the slicing information in clear text.

20. The Initiating AMF of claim 13, wherein the slicing information comprises Network Slice Selection Assistance Information (NSSAI).

* * * * *